United States Patent
Oshita et al.

(10) Patent No.: US 7,238,018 B2
(45) Date of Patent: Jul. 3, 2007

(54) METHOD AND APPARATUS FOR HEATING PLASTIC EXTRUDING DIE

(75) Inventors: Masao Oshita, Hiroshima (JP); Kenji Toda, Hiroshima (JP)

(73) Assignee: The Japan Steel Works, Ltd., Tokyo (JP)

(*) Notice: Subject to any disclaimer, the term of this patent is extended or adjusted under 35 U.S.C. 154(b) by 0 days.

(21) Appl. No.: 11/125,088

(22) Filed: May 10, 2005

(65) Prior Publication Data

US 2005/0248063 A1 Nov. 10, 2005

(30) Foreign Application Priority Data

May 10, 2004 (JP) ............... P2004-139457
Jan. 20, 2005 (JP) ............... P2005-012181

(51) Int. Cl.
*B29C 47/86* (2006.01)

(52) U.S. Cl. ............... 425/379.1; 425/144; 425/378.2; 425/313

(58) Field of Classification Search ............... 264/40.6, 264/143; 425/144, 378.1, 378.2, 379.1, 313
See application file for complete search history.

(56) References Cited

U.S. PATENT DOCUMENTS

| | | | |
|---|---|---|---|
| 3,029,466 A * | 4/1962 | Guill | 425/313 |
| 3,493,996 A * | 2/1970 | Rohn | 425/313 |
| 3,521,325 A * | 7/1970 | Schippers | 425/379.1 |
| 3,593,775 A * | 7/1971 | Privott et al. | 425/378.2 |
| 4,830,595 A * | 5/1989 | Bentivoglio et al. | 264/40.6 |
| 4,962,291 A * | 10/1990 | Fujita et al. | 219/602 |
| 6,043,471 A * | 3/2000 | Wiseman et al. | 219/662 |
| 6,065,953 A * | 5/2000 | Bentivoglio | 425/378.1 |
| 6,474,969 B1 * | 11/2002 | Ready et al. | 425/379.1 |
| 6,562,288 B2 * | 5/2003 | Park | 419/8 |

FOREIGN PATENT DOCUMENTS

| | | |
|---|---|---|
| JP | 2969437 B2 | 11/1999 |
| JP | 2003-62888 A | 3/2003 |
| JP | 2003-326518 A | 11/2003 |

\* cited by examiner

*Primary Examiner*—Robert Davis
*Assistant Examiner*—Joseph Leyson
(74) *Attorney, Agent, or Firm*—Sughrue Mion, PLLC (57) ABSTRACT

A coil surrounding only the tip of nozzles of a plastic extruding die is provided. By passing a high frequency current through the coil to selectively heat only the tip of the nozzles. Further, in a plastic extruding die in which a high frequency current is passed through a coil provided around nozzles to heat the periphery of the nozzles, the coil is formed of a conductor tube through which a coolant is caused to flow.

2 Claims, 8 Drawing Sheets

METHOD AND APPARATUS FOR HEATING PLASTIC EXTRUDING DIE

This application is based on Japanese Patent Applications No. 2004-139457 and 2005-012181, which are incorporated herein by reference.

BACKGROUND OF THE INVENTION

1. Field of the Invention

This invention relates to a method and apparatus for heating a plastic extruding die, and more particularly to a method and apparatus for heating a plastic extruding die capable of controlling the area from the base to tip of nozzles at an appropriate temperature. This invention also relates to a plastic extruding die capable of lengthening the life of the coil for heating the periphery of the nozzles.

2. Description of the Related Art

A plastic extruding die has been proposed in which an inductive coil is provided to surround a large number of nozzles attached to a die used for an extruder and kneader and a high frequency current is passed through the inductive coil thereby to induce an eddy current around the nozzles so that the periphery of the nozzles is directly heated by Joule heat (for example, JP-A-2003-326518).

In the related plastic extruding die, a larger part of the nozzles was heated equally using the inductive extending to exceed half of the nozzle length.

However, the tip of the nozzles is likely to get cool whereas the base of the nozzles is difficult to get cool. This presented the following problem. If the tip of the nozzles is heated at an appropriate temperature, the temperature of the base of the nozzles becomes excessively high. If the base of the nozzles is heated at the appropriate temperature, the temperature of the tip of the nozzles becomes excessively low.

Further, a method for heating a die of an extruder has been proposed in which a coil is provided in the vicinity of a large number of nozzles attached to a die used for an extruder and kneader and a high frequency current is passed through the coil thereby to induce an eddy current around the nozzles so that the periphery of the nozzles is directly heated by Joule heat (for example, Japanese Patent No. 2,969,437).

Further, a method for heating a plastic extruding die has been proposed in which a coil made of a wound wire having a diameter of 1.5 to 3.0 mm φ coated with alumite or ceramic, or flat wire of 2.0×5.0 mm and having a heating resistant temperature of 480° C. to 550° C. is used and a temperature sensor is arranged at the center or in the vicinity of the coil and at least one of the current value and frequency is controlled so that the coil temperature does not exceed the heating resistance temperature (for example, JP-A-2003-62888).

Further, another plastic extruding die has been proposed in which a cool air is passed through the space provided on the outer periphery of a coil to cool the coil (JP-A-2003-326518).

The above method for heating a die of an extruder has presented a problem that the coil itself generates heat by the current flowing through the coil and also is heated by the Joule heat generated in the die so that the coil temperature rises, thus shortening the life of the coil.

The above method for heating a plastic extruding die has presented a problem that the die cannot be heated to a sufficient high temperature because of the limitation by the heating resistant temperature of the coil and if the die is maintained at the high temperature, the coil also becomes the high temperature, thus promoting the deterioration by time passage.

The above plastic extruding die has presented a problem that the contact area of the cold air and coil cannot be increased so that the coil cannot be sufficiently cooled.

SUMMARY OF THE INVENTION

In view of the above circumstance, an object of this invention is to provide a method and apparatus for heating a plastic die capable of controlling the area from the base to tip of nozzles at an appropriate temperature.

Another object of this invention is to provide a plastic extruding die and a plastic extruder capable of sufficiently cooling a coil in order to lengthen the life of the coil.

In accordance with the first aspect of this invention, there is provided a method for heating a plastic extruding die comprising preparing a coil (2) surrounding a tip of a plurality of nozzles of a plastic extruding die (10), the nozzles being provided for extruding plastic, and passing a high frequency current (3) through the coil (2) to selectively heat only the tip of the nozzles (1).

In the above structure, the tip of the nozzles refers to the part of 1/10 to 1/4 of the nozzle length from the tip (end on the resin pouring-out side) of the nozzles (1).

In the above method for heating a plastic extruding die, by preparing the coil (2) surrounding only the tip of the nozzles (1), only the tip of the nozzles (1) is selectively heated so that the tip of the nozzles (1) can be heated to an appropriate temperature. On the other hand, since the base of the nozzles (1) is difficult to get cold. For this reason, if the tip of the nozzles (1) is heated to the appropriate temperature, even if the base of the nozzles (1) is not particularly heated, it is controlled to the appropriate temperature. Thus, the area from the base to the tip of the nozzles (1) can be controlled to the appropriate temperature.

Incidentally, another coil which surrounds only the base of the nozzles (1) may be added. In this case, this coil is driven by lower electric power than the coil which surrounds only the tip of the nozzles (1). The tip of the nozzles refers to the part of 1/10 to 4/10 of the nozzle length from the base of the nozzles (1).

Further, there is provided an apparatus for heating a plastic extruding die comprising a coil (2) surrounding a tip of a plurality of nozzles of a plastic extruding die (10), the nozzles being provided for extruding plastic, an inverter (40) for passing a high frequency current through the coil (2), and a shielding plate (11) of a magnetic laminated plate provided outside the coil (2) and at the side opposite to the tip thereof.

In the above structure, the tip of the nozzles refers to the part of 1/10 to 1/4 of the nozzle length from the tip (end on the resin pouring-outside) of the nozzles (1).

In the above apparatus for heating a plastic extruding die, by preparing the coil (2) surrounding only the tip of the nozzles (1), only the tip of the nozzles (1) is selectively heated so that the tip of the nozzles (1) can be heated to an appropriate temperature. On the other hand, since the base of the nozzles (1) is difficult to get cold. For this reason, if the tip of the nozzles (1) is heated to the appropriate temperature, even if the base of the nozzles (1) is not particularly heated, it is controlled to the appropriate temperature. Thus, the area from the base to the tip of the nozzles (1) can be controlled to the appropriate temperature. Further, the shielding plate (11) of a magnetic laminated plate is provided outside the coil (2) and at the side (base side) opposite to the tip thereof, thereby restraining leakage of magnetic flux.

Incidentally, another coil which surrounds only the base of the nozzles (1) may be added. In this case, this coil is driven by lower electric power than the coil which surrounds only the tip of the nozzles (1). The tip of the nozzles refers to the part of $\frac{1}{10}$ to $\frac{1}{4}$ the nozzle length from the base of the nozzles (1).

Further, there is provided an apparatus for heating a plastic extruding die, wherein the coil (2) is formed of a conductor tube (4) through which a coolant (5) is caused to flow, whereby the coil (2) is cooled.

In this structure, since the coolant (5) is caused to flow the interior of the conductor tube (4) constituting the coil (2), the contact area of the coolant (5) and coil (2) can be increased so that the coil (2) can be sufficiently cooled. For this reason, even if the plastic extruding die (10) is maintained at a high temperature, temperature rise of the coil (2) can be suppressed, thereby permitting the life of the coil (2) to be lengthened. In addition, since the coil (2) is cooled from inside of the conductor tube (4), the vicinity of the nozzles (1) will not be cooled.

Further, there is provided an apparatus for heating a plastic extruding die, wherein a matching transformer (42) is provided between the coil (2) and the inverter (40).

The coil (2) cannot have great inductance. This is because the conductor becomes thick because of the high temperature and the number of turns is limited to several turns or less because of the spatial limitation of surrounding only the tip of the nozzles (1). Therefore the direct connection of the coil with the inverter (40) does not realize the matching. So in the above apparatus for heating a plastic extruding die, the matching transformer (42) is provided between the coil (2) and the inverter (40), thereby realizing the matching between the coil (2) and the matching transformer (42) and between the inverter (40) and the matching transformer (42).

In accordance with the method and apparatus for heating a plastic extruding die according to this invention, the area from the base to the tip of the nozzles can be heated to the appropriate temperature.

In accordance with the second aspect of this invention, there is provided a plastic extruding die in which a coil (2) is provided around a plurality of nozzles for extruding-plastic and a high frequency current (3) is passed through the coil (2) to heat the periphery of the nozzles (1), wherein the coil (2) is formed of a conductor tube (4) through which a coolant (5) is caused to flow, whereby the coil (2) is cooled.

In this structure, since the coolant (5) is caused to flow the interior of the conductor tube (4) constituting the coil (2), the contact area of the coolant (5) and coil (2) can be increased so that the coil (2) can be sufficiently cooled. For this reason, even if the plastic extruding die (10) is maintained at a high temperature, temperature rise of the coil (2) can be suppressed, thereby permitting the life of the coil (2) to be lengthened. In addition, since the coil (2) is cooled from inside of the conductor tube (4), the vicinity of the nozzles (1) will not be cooled.

Further, there is provided the plastic extruding die, wherein the coil (2) is an arrangement of a plurality of arranged coil units (8) each wound with at least one turn of the conductor tube (4) and structured so that the high frequency current is caused to flow in series through the coils units (8) and the coolant (5) is caused to flow in parallel through the coil units (8).

In the above plastic extruding die (10), with the plurality of coil units (8) arranged, the high frequency current (3) is caused to flow in series so that the coil (2) can be operated as a single multiple-turn coil. The high frequency current may be caused to flow in parallel. However, in this case, balance in the current must be assured among the respective coil units (8).

On the other hand, since the coolant (5) is caused to flow in parallel through the coil units (8), the temperature gradient from the coolant supplying mouth (5a) to the coolant discharging mouth (5b) is small. Thus, all the coil units (8) can be effectively cooled. Incidentally, the coolant (5) may be caused to flow in series through the coil units (8). However, in this case, the temperature gradient from the coolant supplying mouth to the coolant discharging mouth is large so that the cooling efficiency of the coil unit (8) at a downstream side is deteriorated.

Further, there is provided a plastic extruding machine (200) provided with the plastic extruding die (10).

Since this plastic extruding machine (200) uses the above plastic extruding die (10), even if the plastic extruding die is maintained at the high temperature, the temperature rise in the coil (2) can be restrained, thereby permitting the life of the coil (2) to be lengthened.

In accordance with the plastic extruding die according to this invention, it is possible to prevent the coil (2) from being excessively heated, thereby permitting the life of the coil (2) to be lengthened. Thus, without injuring the endurance of the coil (2), the nozzles (1) can be maintained at the high temperature. For this reason, the raw material having a high melting point and so the clogging of the nozzle (1) can be prevented.

DETAILED DESCRIPTION OF THE PREFERRED EMBODIMENTS

A detailed explanation will be given of this invention with reference to embodiments as shown. Incidentally, by this explanation, this invention should be not be limited.

First Embodiment

Figure 1:
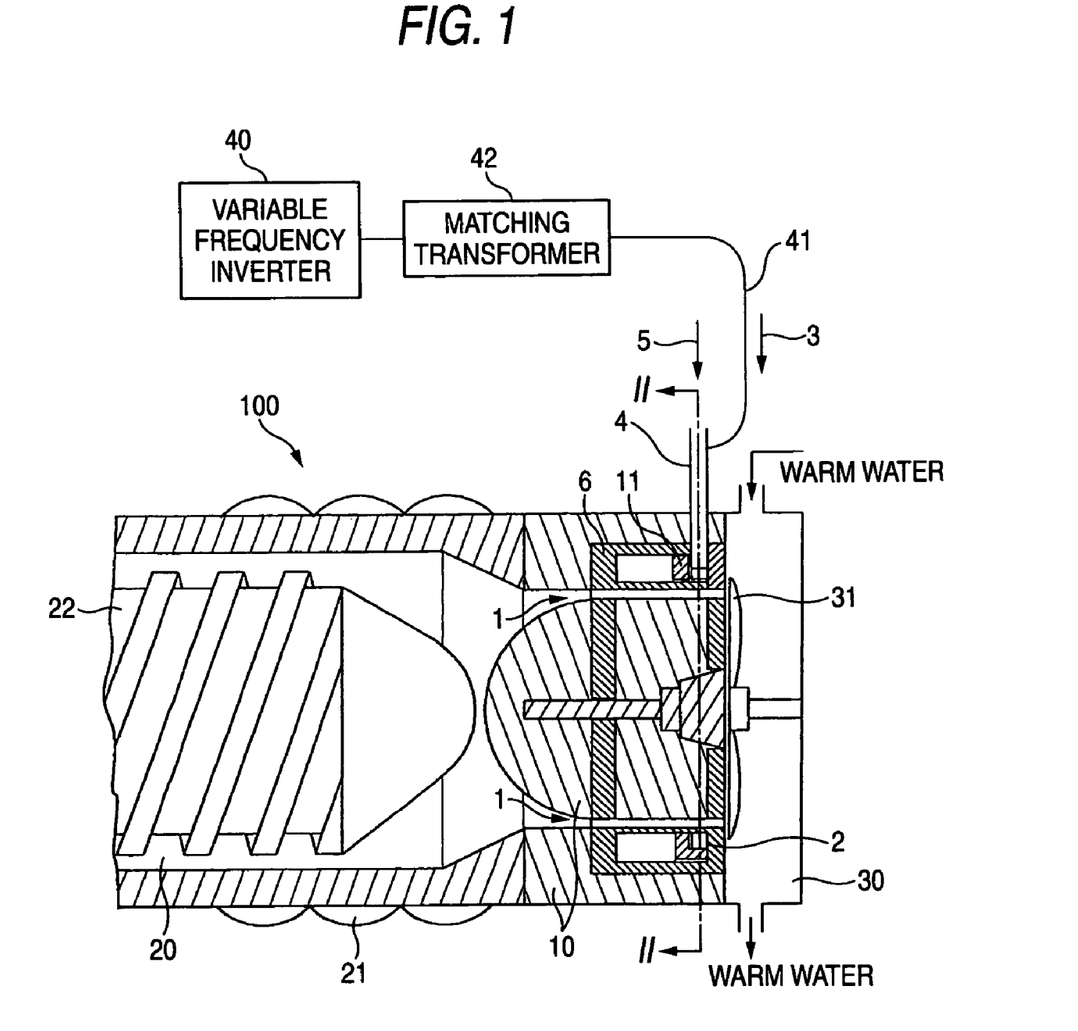
FIG. 1 is a longitudinal sectional view of a plastic extruder according to a first embodiment of this invention.
Figure 2:
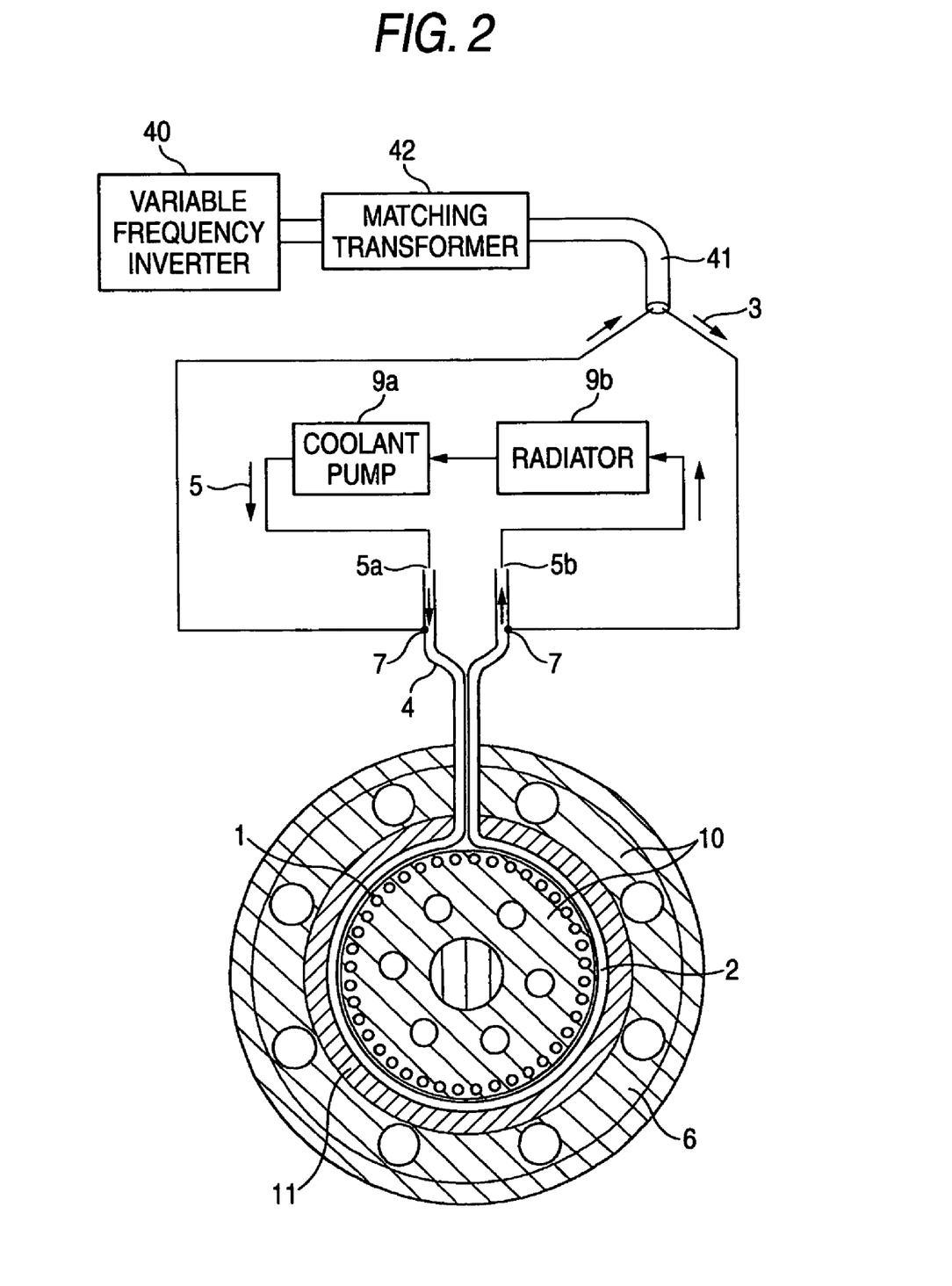
FIG. 2 is a cross sectional view taken in line II-II in FIG. 1.

FIG. 1 is a longitudinal sectional view of the plastic extruder according to the first embodiment of this invention. FIG. 2 is a cross sectional view taken in line II-II in FIG. 1.

In a plastic extruder 100 as shown, using a screw 22, an extruding unit 20 kneads the raw material pellet and additive supplied from a feeder not shown while they are heated and molten by a heater 21, and sends them to a plastic extruding die 10.

The plastic extruding die 10 extrudes molten resin in a stick shape from a large number of nozzles 1.

A cutting unit 30 cuts the stick-shaped resin extruded from the plastic extruding die 10 using a cutting blade 31. The resin is cooled by warm water to be formed in a resin pellet.

A coil 2 accommodated in a coil case 6 is provided around the nozzles 1 of the plastic extruding die 10.

The coil 2 is made by winding a conductive tube 4 by one turn, and surrounds only the tip of the nozzles 1.

Further, outside the coil 2 and at the side opposite to the tip (base side) thereof, a shielding plate 11 of a magnetic laminated plate is provided to restrain leakage of magnetic flux.

A high frequency current 3 is supplied to the coil 2 from a variable frequency inverter 40 through a matching transformer 42 and a power supply cable 41.

The matching transformer 42 is a transformer for impedance-matching the coil 2 having very small inductance of only one turn and the variable frequency inverter 40.

As seen from FIG. 2, a coolant (cooling water) 5 is supplied from a coolant pump 9a to a coolant supplying mouth 5a and passed through the conductive tube 4. After the coolant 5 has cooled the coil 2, it returns to a coolant pump 9a via a radiator 9b from a coolant discharge mouth 5b.

Figure 3:
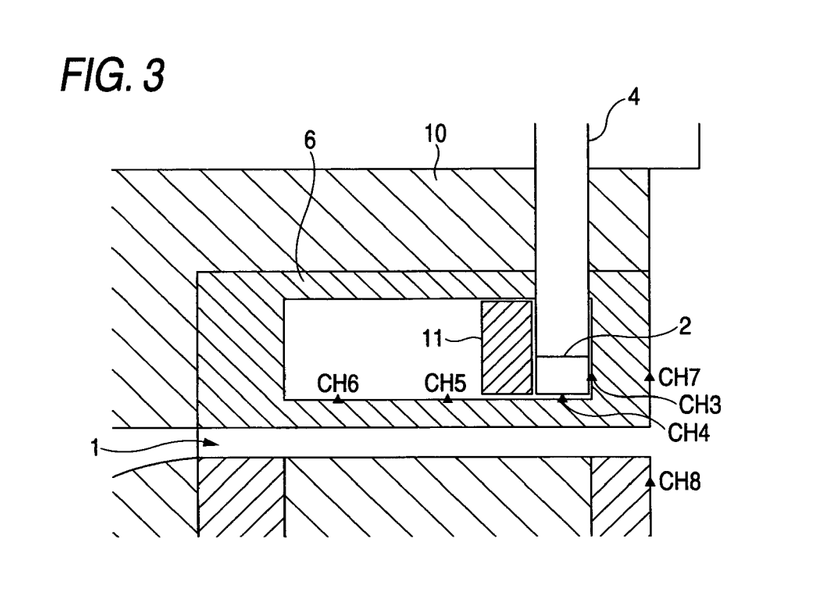
FIG. 3 is a sectional view schematically showing the respective temperature measuring points in the vicinity of nozzles according to the first embodiment of this invention.

FIG. 3 schematically shows temperature measuring points CH3 to CH8 in the vicinity of each of the nozzles 1.

Figure 4:
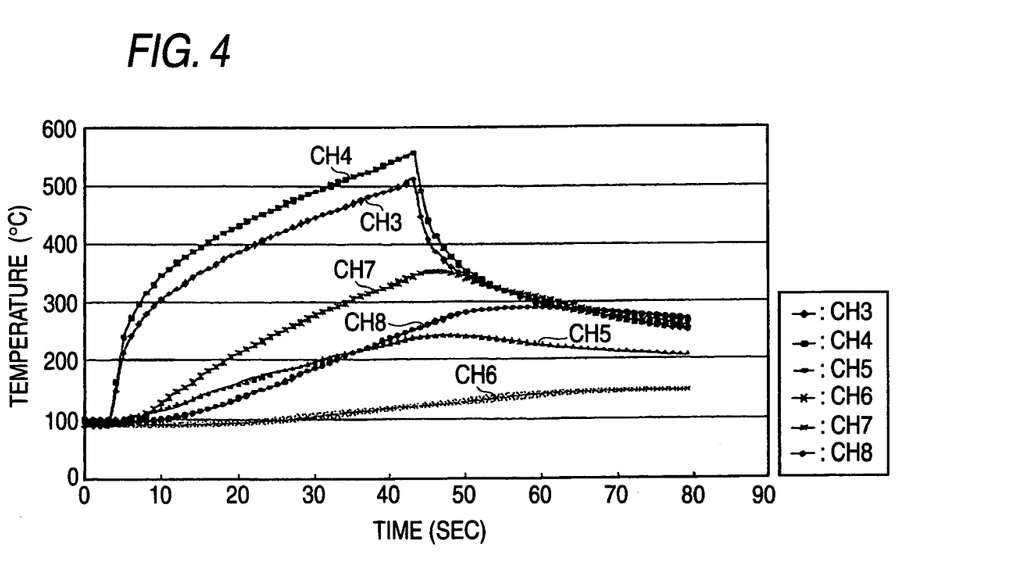
FIG. 4 is a characteristic graph showing temperature changes in the vicinity of the nozzle according to the first embodiment.

FIG. 4 shows temperatures at the respective temperature measuring points when the coil 2 is driven by electric power of 15 kW. This measurement is carried out for each plastic extruding die 10 in which the resin is not passed through the nozzles 1.

The temperatures at CH3 and CH4 reach 500° C. or higher from 100° C. for about 50 seconds. At this time, the variable frequency inverter 40 is turned off.

Figure 5:
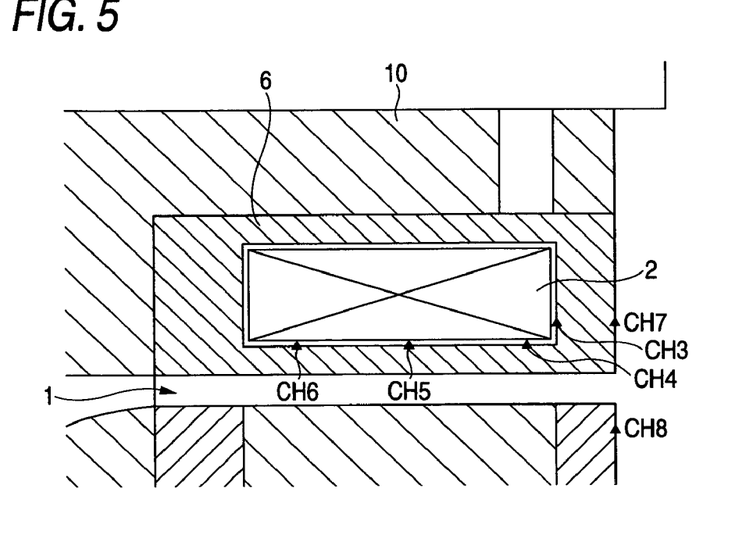
FIG. 5 is a sectional view schematically showing the respective temperature measuring points in the vicinity of nozzles according to a related art.

FIG. 5 schematically shows temperature measuring points CH3 to CH8 in the vicinity of each of the nozzles 1.

Figure 6:
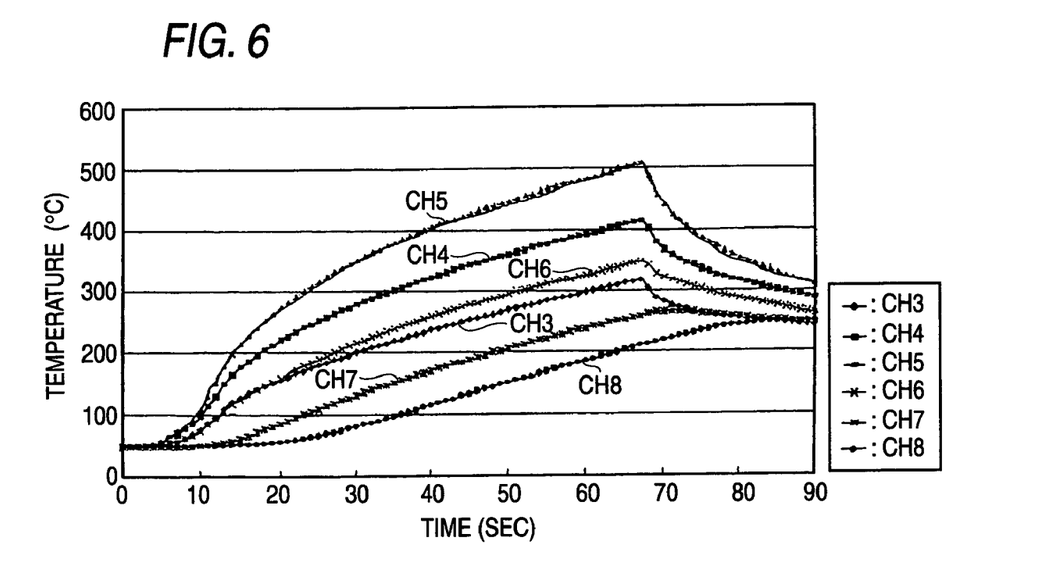
FIG. 6 is a characteristic graph showing temperature changes in the vicinity of the nozzles according to the related art.

FIG. 6 shows temperatures at the respective temperature measuring points when the ordinary coil 2 is driven by electric power of 15 kW. This measurement is carried out for each plastic extruding die 10 in which the resin is not passed through the nozzles 1.

The temperature at CH5 reaches 500° C. or higher from 50° C. in about 65 seconds. At this time, the variable frequency inverter 40 is turned off.

As understood from the comparison between FIG. 4 and FIG. 6, in accordance with this invention, the tip (CH3, CH4, CH7, CH8) of the nozzles 1 can be heated at a steep rise whereas the base (CH6) of the nozzles 1 is not heated.

Thus, the tip (CH3, CH4, CH0, CH8) of the nozzles 1 which is likely to get cold by warm water can be heated at an appropriate temperature by the coil 2. The base (CH6) of the nozzles 1 which is difficult to get cold by the thermal conduction from the heater 21 is prevented from reaching an excessively high temperature.

In short, if the tip of the nozzles 1 is heated at the appropriate temperature, the area from the base to tip of the nozzles can be controlled at an appropriate temperature.

Second Embodiment

Another coil which surrounds only the base of the nozzles 1 may be added. In this case, this coil is driven by lower electric power than the coil which surrounds only the tip of the nozzles 1.

Third Embodiment

Figure 7:
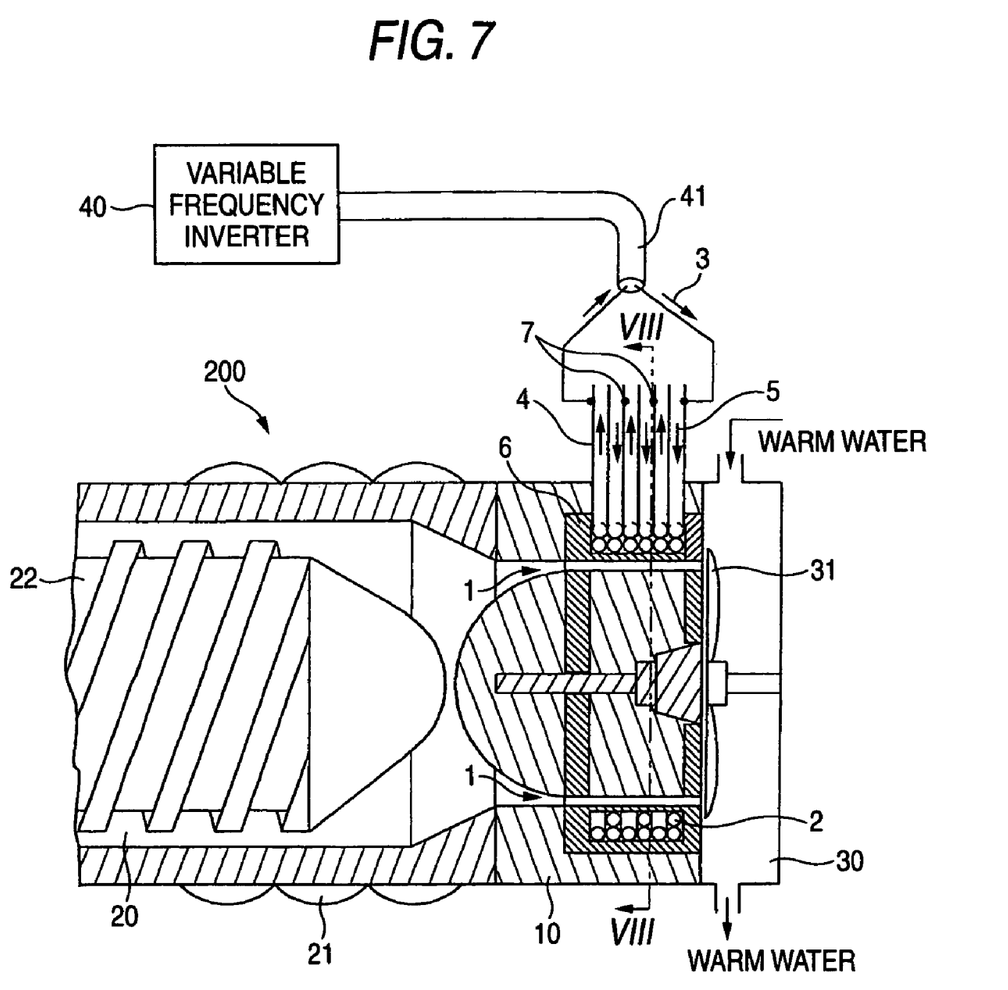
FIG. 7 is a longitudinal sectional view of a plastic extruder according to the third embodiment of this invention.
Figure 8:
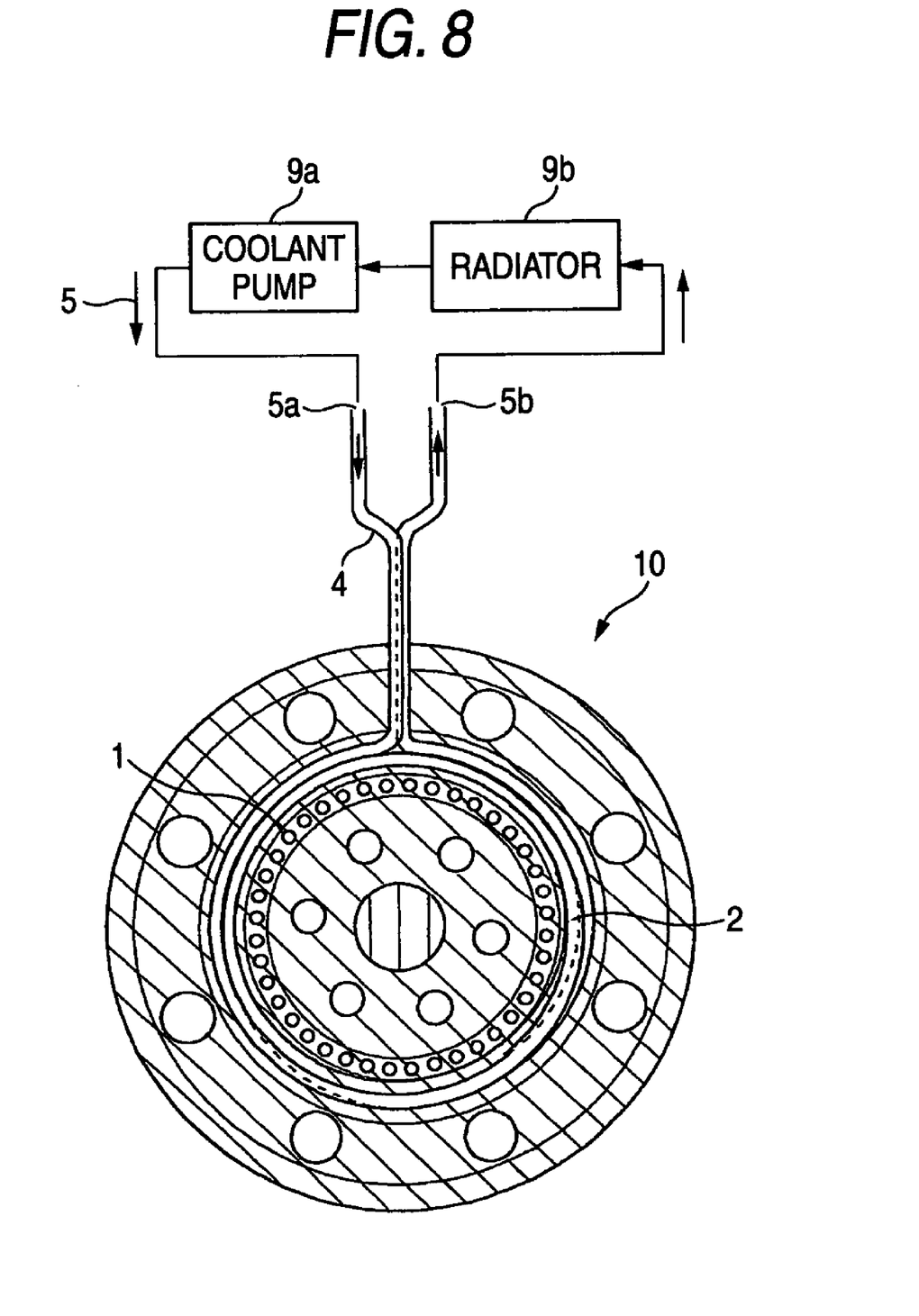
FIG. 8 is a cross sectional view taken in line VIII-VIII in FIG. 7.

FIG. 7 is a longitudinal sectional view of the plastic extruder according to the third embodiment of this invention. FIG. 8 is a cross sectional view taken in line VIII-VIII in FIG. 7.

Around the nozzles 1 of the plastic die 10, a coil 2 accommodated in the coil case 6 is provided.

The coil 2 is an arrangement of coil units (8 in FIGS. 9A and 9B) each made by winding the conductive tube 4.

As seen from FIG. 7, the high frequency current 3 is supplied in series from the variable frequency inverter 40 to all the coil units 8 through the power supplying cable 41.

As seen from FIG. 8, the coolant 5 is supplied from the coolant pump 9a to the coolant supplying mouth 5a and passed in parallel each of the coil units 8. After the coolant 5 has cooled the coil 2, it returns to a coolant pump 9a via a radiator 9b from the coolant discharge mouth 5b.

Figure 9A:
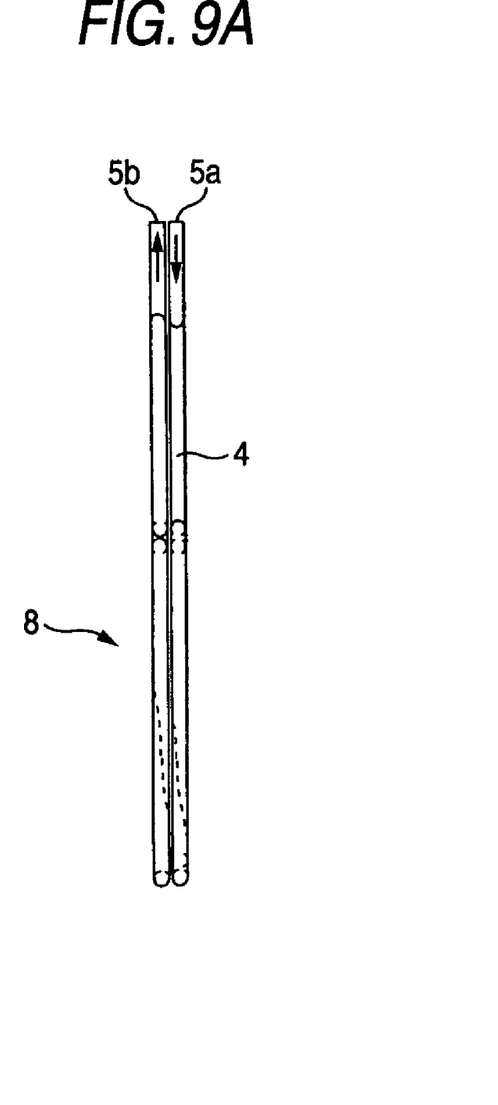
FIGS. 9A-9B are a side view and a front view, respectively, of a coil unit.
Figure 9B:
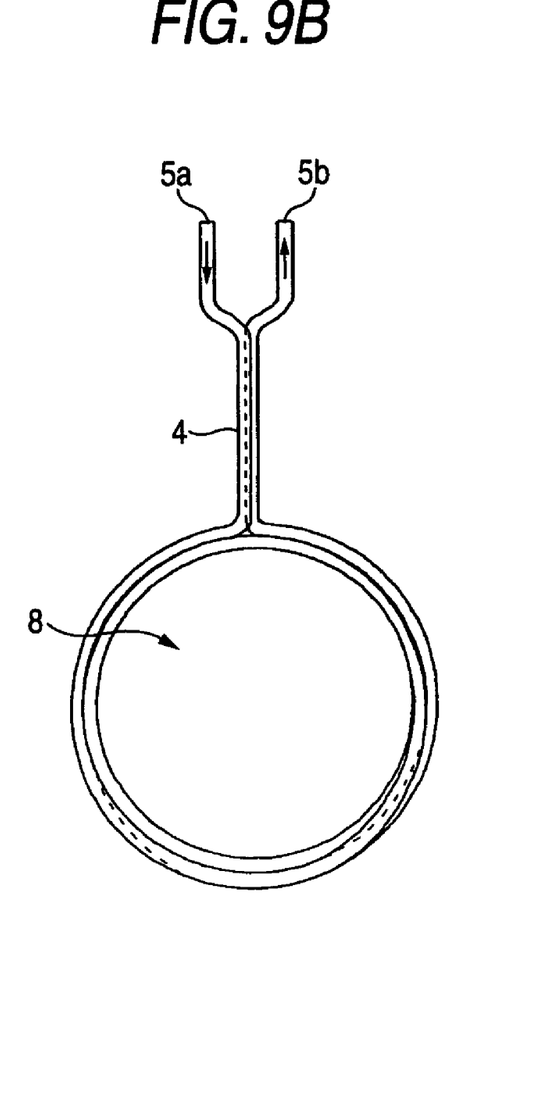

FIG. 9A is a side view of a single coil unit 8, and FIG. 9B is a front view of the single coil unit 8.

The coil unit 8 is composed of three turns of the conductive tube 4. The coil unit 8 may be composed of one turn, two turns or four or more turns of the conductive tube 4.

Figure 10:
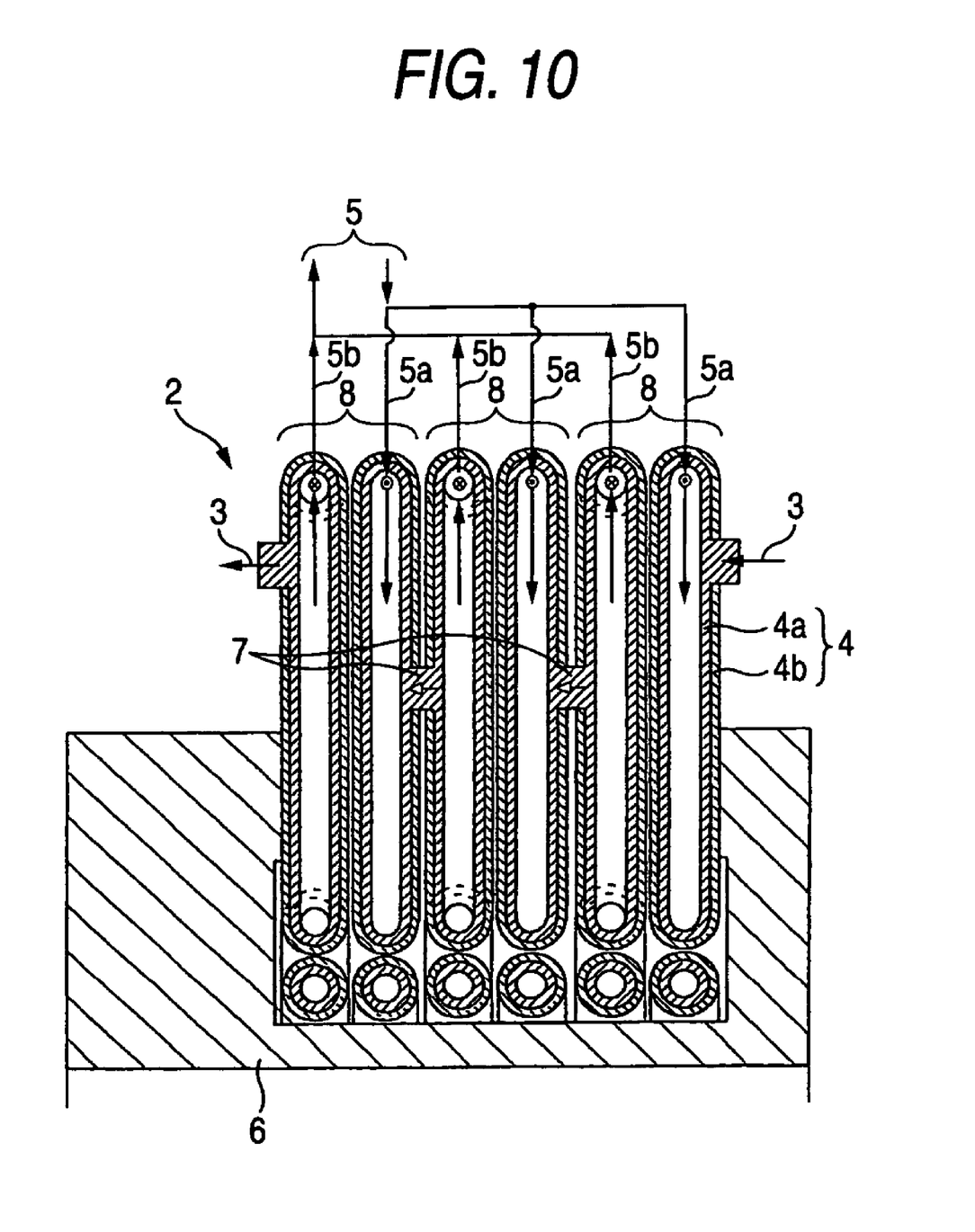
FIG. 10 is an enlarged section view of the main part of the coil.

FIG. 10 is an enlarged sectional view of the main part of the coil 2.

The coil 2 is composed of three coil units 8. The coil 2 may be composed of two or less or four or more coil units 8.

Each coil turn 8 is composed of three turns of the conductive tube 4. The conductive tube 4 is a copper tube 4a coated with a heat-shrinkable tube 4b so that it is insulated.

The adjacent coil units 8 are connected to each other at electric connecting points 7 by welding or soldering. So, the high frequency current 3 flows in series through all the coil units 8. Thus, the coil 2 serves as the coil with nine turns.

On the other hand, each coil unit 8 has a coolant supplying mouth 5a and a coolant discharging mouth 5b which are separated from each other. According thereto, the coolant 5 flows in parallel through the respective coil units 8. Thus, any coil unit 8 can be equally effectively cooled. In addition, since the coil unit 8 is cooled from inside of the conductor tube 4, the vicinity of the nozzles 1 will not be cooled.

The plastic extruding die 10 according to the third embodiment provides the following advantages.

(1) By cooling the interior of the conductor tube 4 using the coolant 5, it is possible to prevent the coil 2 from being excessively heated so that its life can be lengthened. In other words, since the vicinity of the nozzles 1 can be maintained at a high temperature, the raw material having a high melting point and so the clogging of the nozzles 1 can be prevented.
(2) Since the conductor tube 4 is cooled from inside, the vicinity of the nozzles 1 will not be cooled.
(3) Since the coolant is caused to flow in parallel through the respective coil units, any coil unit 8 can be equally effectively cooled.

The method and apparatus for heating the plastic extruding die according to this invention can deal with an engineering plastic with a high melting point.

Further, the plastic extruding die and plastic extruding machine according to this invention can be preferably used to make the plastic pellets with high melting points.

What is claimed is:

1. A plastic extruding die comprising:
   a plurality of nozzles for extruding plastic; and
   a plurality of coil units each wound with at least one turn of a conductor tube provided around the nozzles, wherein a high frequency current is caused to flow in series through the coil units to heat the periphery of the nozzles, and
   coolant is caused to flow in parallel through the conductor tubes constituting the coil units, whereby the coil units are cooled.

2. A plastic extruding machine comprising a plastic extruding die according to claim 1 and a housing including a screw for kneading and supplying raw material to the plastic extruding die.

* * * * *